June 26, 1928.
J. S. ANDERSON
VEHICLE SIGNAL
Filed March 19, 1928
1,675,017
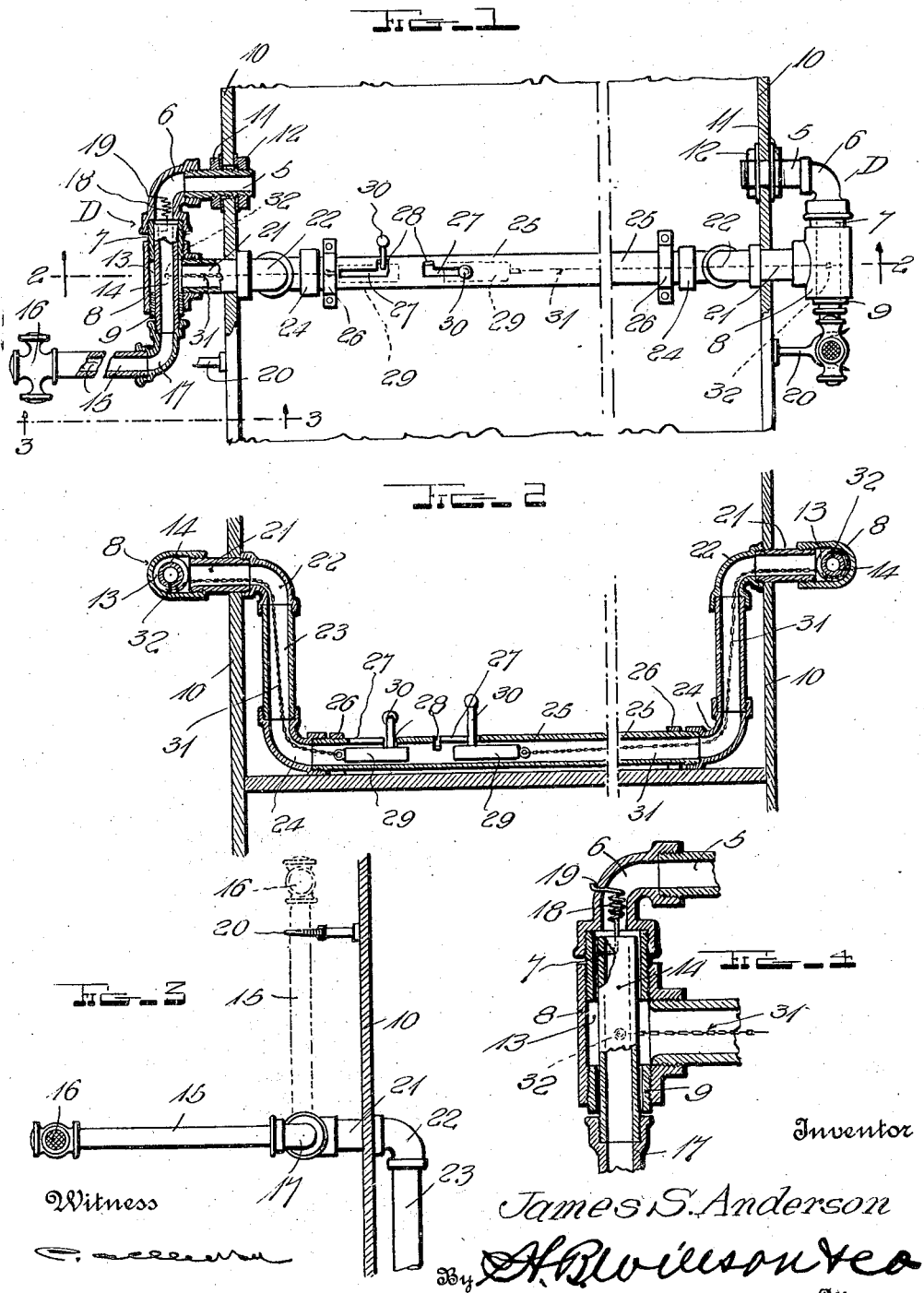
Inventor
James S. Anderson
By H. B. Willson &co.
Attorneys
Witness Patented June 26, 1928.

1,675,017

UNITED STATES PATENT OFFICE.

JAMES S. ANDERSON, OF AMES, NEBRASKA.

VEHICLE SIGNAL.

Application filed March 19, 1928. Serial No. 262,831.

The invention relates to signals mounted on automobiles to show the driver's intentions, particularly with regard to turning, and said invention has reference to signals of the type making use of a vertically swingable signal arm.

One object of the invention is to provide new and improved means for mounting and operating the shaft which carries the signal arm.

A further aim is to provide a construction in which a combined tension and torsional spring, serves to hold the signal-carrying shaft against sliding from its bearing and also acts to rotate said shaft in one direction, thereby restoring the signal-carrying arm to its normal position after each projection of said arm.

A further object of the invention is to provide rather simple and inexpensive, yet efficient and desirable details of construction for attaining the ends in view.

With the foregoing objects in view, the invention resides in the novel subject matter hereinafter described and claimed, description being accomplished by reference to the accompanying drawing.

Fig. 1 is a horizontal sectional view partly in elevation showing two of the signals attached to the body of an automobile.

Fig. 2 is a vertical transverse sectional view on line 2—2 of Fig. 1.

Fig. 3 is a detail sectional view on line 3—3 of Fig. 1, showing one of the signal arms projected in full lines and retracted in dotted lines.

Fig. 4 is an enlarged detail horizontal sectional view, partly in elevation, being similar to the left hand portion of Fig. 1.

Two signalling devices are shown, both indicated in a general way by the character D. but as the construction of both of them is identical in certain respects, a description of one will suffice for both.

An L-shaped tubular body is provided, here shown as consisting of a comparatively long nipple 5, an elbow 6, a short nipple 7, a T 8, and another short nipple 9. The nipple 5 is adapted for passage through an opening in a vertical side 10 of an automobile body and is provided with a clamping shoulder 11 preferably in the form of a nut and with a clamping nut 12, for securing it in said opening. One end of the elbow 6 is threaded upon the outer end of this nipple, the nipple 7 is threaded into the other end of said elbow, the head of the T 8 is threaded at one of its ends upon the nipple 7, and the nipple 9 is threaded into the other end of the T head, the axis of the parts 7—8—9, being horizontal. The space within the T 8, denoted at 13, constitutes an internal enlargement for a bearing which is provided by the parts 7—8—9.

A horizontal shaft 14, preferably of tubular form, is rotatably received in the bearing above described and carries a signal arm 15 having an appropriate illuminated signal 16 at its outer end. Current-conducting wiring not shown for the signal 16, may pass through the arm 15, the shaft 14, the elbow 6 and the nipple 5 to receive current from the usual automobile battery, any desired switch means being employed of course with said wiring. The signal arm 15 and the shaft 14 are connected in the present disclosure, by an elbow 17, one end of which constitutes a shoulder to abut the nipple 9 and limit the inward movement of the shaft within its bearing. Disposed within the elbow 6 and secured at one end to the shaft 14, is a coiled spring 18 whose other end is suitably secured to said elbow as denoted at 19. This spring is a combined tension spring and torsional spring. The tension of the spring holds the shaft 14 against outward sliding from its bearing 7—8—9, maintaining the elbow 17 against the outer end of said bearing, and the torsional action of the spring serves to rotate the shaft 14 in one direction, so as to normally hold the signal arm 15 in a raised in-operative position, in which it may well be steadied by reception within a fork 20.

Tubing is connected with the shank of the elbow 8 and contains operating means for turning shaft 14 against the action of the spring 18. This tubing may well consist of the parts now to be described. 21 denotes a nipple threaded into the T 8 and projecting horizontally inward therefrom for passage through an opening in the side 10 of the car body. 22 has reference to an elbow threaded upon the inner end of nipple 21, and 23 denotes a short length of pipe threaded into the elbow and projecting downwardly therefrom. The lower end of this pipe is threaded into another elbow 24, and the elbows 24 of the two signal devices D are connected to opposite ends of a horizontal pipe 25 which may be secured by appropriate means 26 upon the floor of the car, to act as a foot rail. This pipe 25 is provided with longitudinal slots 27, each having an offset 28. Two slides 29 are operable within the pipe and are provided with projections 30 extending through the slots 27 and capable of reception in the offsets 28 thereof. The two slides 29 are connected by appropriate flexible lines, such as chains 31 with the two shafts 14 of the devices D. The outer end of each chain 31 extends a suitable distance around the shaft 14 to effect rotation of this shaft and movement of arm 15 to a horizontal position, when slide 29 is moved and its projections 30 engaged with the offset 28. Preferably, a screw 32 is employed for attaching the chain to the shaft. Outward swinging of arm 15 of course takes place against the torsional action of the spring 18. Hence, as soon as projection 30 is released from offset 28, this spring so rotates the shaft 14 as to restore the arm 15 to its normal, idle position. Either of the projections 30 may be quickly and easily operated by one foot or the other, to project either signal according to the direction in which a turn is to be made.

The details disclosed are preferably followed, but within the scope of the invention as claimed, variations may be made.

I claim:

1. A vehicle signal comprising an elongated stationary body having a straight tubular portion constituting a bearing, a shaft rotatably mounted in said bearing and having a lateral signal arm and a shoulder at one end, said shoulder abutting one end of the bearing to limit inward movement of the shaft into the bearing, a combined torsion and tension spring connected to said shaft and anchored to said body, the tension of said spring holding said shaft against outward sliding from said bearing and the torsional action of the spring serving to rotate said shaft in one direction, and means for turning said shaft against the torsional action of said spring.

2. A vehicle signal comprising a tubular body constituting a bearing, said bearing being internally enlarged between its ends and having a lateral opening into its enlargement, a signal-carrying shaft rotatably mounted in said bearing, and a flexible line wound around said shaft within said enlargement of said bearing and extending through said lateral opening of the bearing, constituting means for turning the shaft.

3. A vehicle signal comprising a tubular body constituting a bearing, said bearing being internally enlarged between its ends, tubing connected to and extending horizontally in one direction from said bearing for passage through an opening in a car body, said tubing then extending downwardly and then again horizontally in said one direction for disposition within the car body and having a longitudinal slot in its last named portion, said slot being provided with an offset, a signal-carrying shaft rotatably mounted in said bearing, a flexible line wound upon said shaft within said enlargement, said line extending longitudinally in said tubing, a slide in the slotted portion of said tubing connected to said line for operating the latter to turn said shaft, and a projection on said slide operable in said slot and receivable in said offset to hold the shaft in one position.

4. A vehicle signal comprising an L-shaped tubular body having a clamping shoulder and a clamping nut at one end for securing said end in an opening of a car body, the other end portion of said tubular body constituting a bearing, said bearing being internally enlarged between its ends, tubing connected to and extending horizontally in one direction from said bearing for passage through an opening in a car body, said tubing then extending downwardly and then again horizontally in said one direction for disposition within the car body and having a longitudinal slot in its last named portion, said slot being provided with an offset, a signal-carrying shaft rotatably mounted in said bearing, a flexible line wound upon said shaft within said enlargement, said line extending longitudinally in said tubing, a slide in the slotted portion of said tubing connected to said line for operating the latter to turn said shaft, and a projection on said slide operable in said slot and receivable in said offset to hold the shaft in one position.

5. A vehicle signal comprising an L-shaped tubular body having a clamping shoulder and a clamping nut at one end for securing said end in an opening of a car body, the other end portion of said tubular body constituting a bearing, said bearing being internally enlarged between its ends, a shaft rotatable in said bearing and having a signal arm and a shoulder at one end, said shoulder abutting the outer end of said bearing and limiting inward movement of the shaft, a combined tension and torsion spring in said body anchored at one end thereto and connected at its other end to said shaft, the tension of said spring serving to hold the shaft against outward sliding and the torsional action of said spring being effective to rotate said shaft in one direction, tubing connected to and extending horizontally in one direction from said bearing for passage through an opening in a car body, said tubing then extending downwardly and then again horizontally in said one direction for disposition within the car body and having a longitudinal slot in its last named portion, said slot being provided with an offset, a flexible line wound upon said shaft within said enlargement, said line extending longitudinally in said tubing, a slide in the slotted portion of said tubing connected to said line for operating the latter to turn said shaft, and a projection on said slide operable in said slot and receivable in said offset to hold the shaft in one position.

In testimony whereof I have hereunto affixed my signature.

JAMES S. ANDERSON.